US008825249B2

(12) United States Patent
Ohno (10) Patent No.: US 8,825,249 B2
(45) Date of Patent: Sep. 2, 2014

(54) DRIVE CONTROL DEVICE FOR SERIES HYBRID VEHICLE

(75) Inventor: Akiyoshi Ohno, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 188 days.

(21) Appl. No.: 13/601,150

(22) Filed: Aug. 31, 2012

(65) Prior Publication Data
US 2013/0085633 A1   Apr. 4, 2013

(30) Foreign Application Priority Data

Sep. 29, 2011   (JP) ................................. 2011-215029

(51) Int. Cl.
  *B60L 9/00*   (2006.01)
  *B60L 11/00*  (2006.01)
  *H02J 7/14*   (2006.01)
  *B60W 20/00*  (2006.01)

(52) U.S. Cl.
  CPC .................................... *B60W 20/00* (2013.01)
  USPC ........................................ 701/22; 320/104

(58) Field of Classification Search
  CPC ..... B60W 20/00; Y02T 90/14; Y02T 10/7005
  USPC ....................... 701/22; 903/903, 907; 320/104
  See application file for complete search history.

(56) References Cited

U.S. PATENT DOCUMENTS

2007/0255463 A1*  11/2007  Kikuchi ........................... 701/22
2009/0125172 A1*  5/2009   Matsubara ....................... 701/22

FOREIGN PATENT DOCUMENTS

| JP | 11-346402 A  | 12/1999 |
| JP | 2001-90572 A | 4/2001  |
| JP | 2001-95102 A | 4/2001  |
| JP | 2009-184387 A| 8/2009  |
| JP | 2010-173389 A| 8/2010  |

\* cited by examiner

*Primary Examiner* — Mary Cheung
(74) *Attorney, Agent, or Firm* — Rothwell, Figg, Ernst & Manbeck, P.C.

(57) ABSTRACT

A hybrid system includes a hybrid controller which controls the speed and torque of an engine based on the operated level of an accelerator pedal within a first range where the power generation efficiency of the system becomes equal to or higher than a preset power generation efficiency to allow the engine to operate at an engine operating point when the SOC detected by an SOC sensor is equal to or higher than an HEV low SOC, and which controls the speed and torque of the engine based on the operated level of the accelerator pedal within a second range where the power generated by a power generator motor becomes larger than that of the first range to allow the engine to operate at the engine operating point when the SOC detected by the SOC sensor is lower than the HEV low SOC.

4 Claims, 9 Drawing Sheets

DRIVE CONTROL DEVICE FOR SERIES HYBRID VEHICLE

CROSS-REFERENCE

This document claims priority to Japanese Application Number 2011-215029, filed Sep. 29, 2011, the entire content of which is hereby incorporated by reference.

TECHNICAL FIELD

The present invention relates to a control for a series hybrid vehicle.

BACKGROUND ART

Prior art patent documents 1 to 5 below disclose series hybrid vehicles, respectively.

According to a conventional engine control for such a series hybrid vehicle, a necessary drive and an operation that supplies power to be consumed to an air conditioner, etc., are performed through a fixed-point operation (an operation that makes an accelerator pedal opening degree not associated with an engine speed) mainly at a maximum efficiency point or in accordance with the accelerator pedal opening degree completely.

PRIOR ART DOCUMENTS

Patent Documents

Patent Document 1: JP 2010-173389A
Patent Document 2: JP 2009-184387A
Patent Document 3: JP 2001-95102A
Patent Document 4: JP 2001-90572A
Patent Document 5: JP Hei11-346402A

SUMMARY OF THE INVENTION

Problem to be Solved

According to the above-mentioned fixed-point operation, however, a change in vehicle speed or a change in accelerator pedal opening degree does not correspond to a change in engine sound. For this reason, a driving feeling different from an acceleration feeling obtained in the case of a combustion-engine vehicle may cause a driver and a passenger to feel strange.

Moreover, in the case of the completely associated operation, a time when the power generation and the power consumption are balanced is long, and the effect to the battery charging/discharging efficiency is little. However, when a vehicle is stopping or is fully accelerated, the engine efficiency decreases, and the power generation efficiency also decreases.

It is an object of the present invention to accomplish both providing acceleration feeling in accordance with a change in engine speed and improvement in the power generation efficiency.

Solution to the Problem

To achieve the above object, a first aspect of the present invention provides a drive control device for a series hybrid vehicle including an engine, a power generator motor driven by the engine, a battery charged by the power generated by the power generator motor, and a drive motor that drives driving wheels by the power generated by the power generator motor or discharged power by the battery, the drive control device including: an accelerator pedal operated level detector that detects an operated level of an accelerator pedal; a charging level detector that detects a charging level of the battery; and a controller which controls a speed and a torque of the engine to allow the engine to operate at an engine operating point corresponding to a target engine speed and a target engine torque based on the operated level of the accelerator pedal detected by the accelerator pedal operated level detector within a first range where a power generation efficiency obtained based on a drive efficiency of the engine and a motor drive efficiency of the power generator motor is equal to or higher than a preset power generation efficiency when the charging level detected by the charging level detector is equal to or higher than a preset charging level, and which controls the speed and the torque of the engine to allow the engine to operate at the engine operating point based on the operated level of the accelerator pedal detected by the accelerator pedal operated level detector within a second range where the power generated by the power generator motor is larger than the generated power in a case of the first range when the charging level detected by the charging level detector is smaller than the preset charging level.

According to another aspect of the present invention, the drive control device further includes a vehicle speed detector that detects a vehicle speed, in which when the vehicle speed detected by the vehicle speed detector is equal to or slower than a preset vehicle speed, the controller controls the speed and the torque of the engine within a range where the power generated by the power generator motor is smaller than the generated power in a case of the first range to allow the engine to operate at the engine operating point.

According to the other aspect of the present invention, when the charging level detected by the charging level detector is smaller than the preset charging level, the controller controls the speed and the torque of the engine so as to increase the power generated by the power generator motor more than the generated power in a case in which the charging level detected by the charging level detector is equal to or higher than the preset charging level to allow the engine to operate at the engine operating point.

Moreover, according to the further other aspect of the present invention, when the vehicle speed detected by the vehicle speed detector is zero, the controller controls the speed of the engine to be zero.

Advantageous Effects of the Invention

According to the present invention, the engine can be operated within the first range where the power generation efficiency is high, and the power generation efficiency can be improved.

Moreover, according to the present invention, the engine speed can be changed in accordance with the operated level of the accelerator pedal, and an acceleration feeling can be given to a driver and a passenger through engine sound in accordance with the operated level of the accelerator pedal.

Moreover, according to the present invention, when the charging level of the battery is low, the engine can be operated within the second range where the power generated by the power generator motor becomes increased, thereby recovering the charging level of the battery by increasing the charging level thereof.

As explained above, according to the present invention, it is possible to accomplish both providing an acceleration feeling in accordance with a change in the engine speed and improvement of the power generation efficiency.

Furthermore, according to the present invention, since the engine speed can be reduced when the vehicle is running at a slow speed, thereby it is possible to prevent a driver and a passenger from feeling of discomfort due to engine sound.

According to the present invention, it is possible to alert a pedestrian, etc., to the approach of the vehicle by the engine speed decreased when the vehicle is running at a slow speed.

According to the present invention, when the charging level of the battery decreases even when the vehicle is running at a slow speed, the engine is operated to increase the power generated by the power generator motor, thereby increasing the charging level of the battery.

Still further, according to the present invention, it is possible to prevent the driver and the passenger from feeling of discomfort due to the engine sound when the vehicle is stopping.

DESCRIPTION OF EMBODIMENTS

An explanation will be given of an embodiment of the present invention with reference to the accompanying drawings.

The embodiment relates to a hybrid system of a series hybrid vehicle.

(Configuration)

Figure 1:
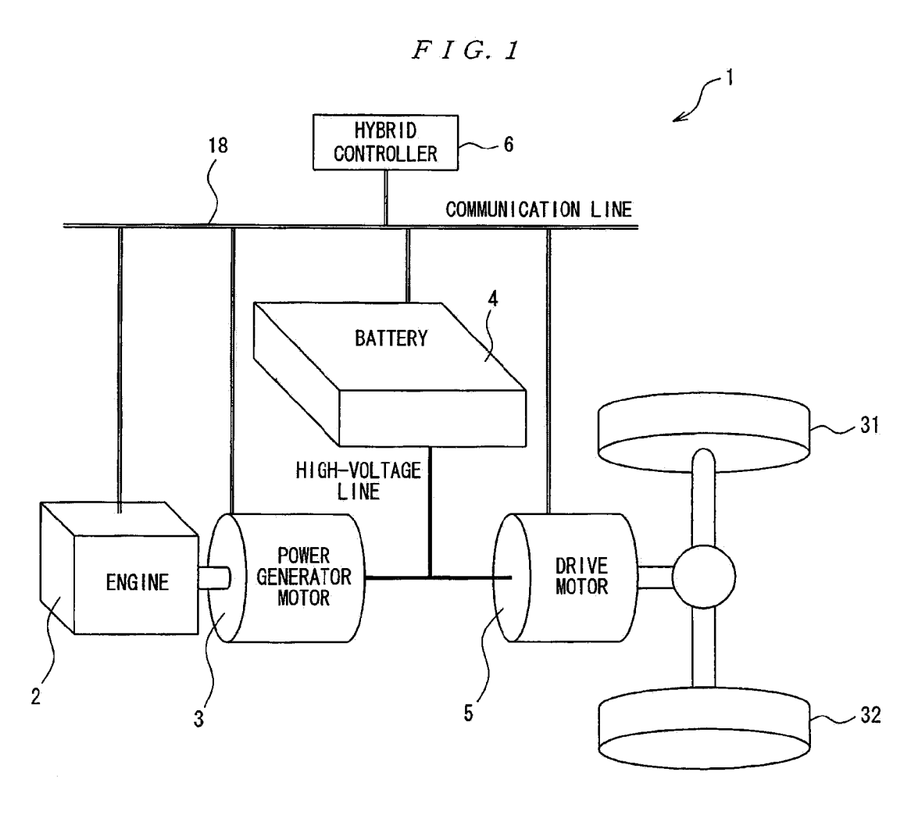
FIG. 1 is a diagram showing an illustrative configuration of a hybrid system of a series hybrid vehicle according to an embodiment.
Figure 2:
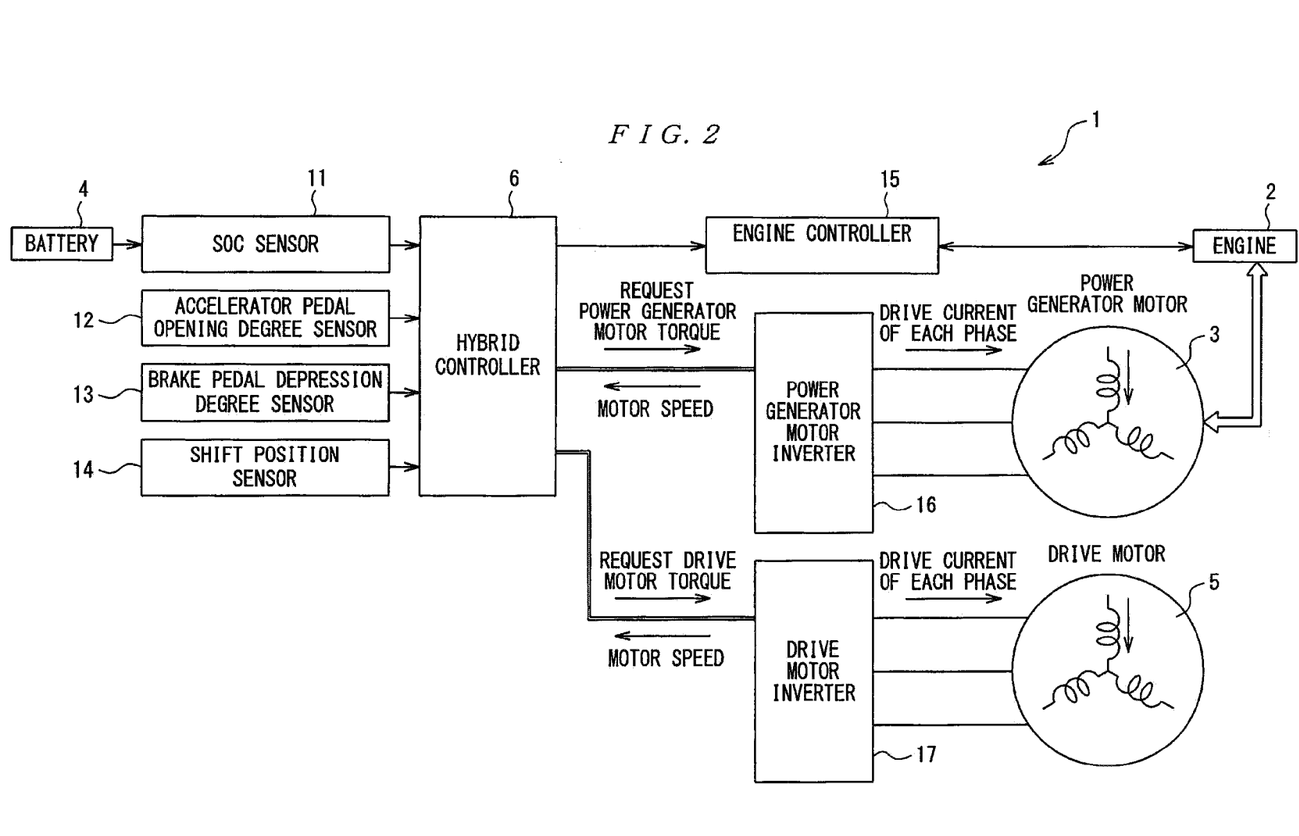
FIG. 2 is another diagram showing an illustrative configuration of a hybrid system of a series hybrid vehicle according to the embodiment.

FIGS. 1 and 2 are diagrams showing an illustrative configuration of a hybrid system 1 for a series hybrid vehicle. As shown in FIG. 1, the hybrid system 1 of the series hybrid vehicle employs a configuration in which an output shaft of an engine 2 and an input shaft of a power generator motor 3 are coupled in series, and a drive motor 5 is rotated by the power generated by the power generator motor 3 or discharged power from a battery 4 to drive driving wheels 31 and 32. The hybrid system 1 of the series hybrid vehicle of this embodiment can change the mode between an electric vehicle running mode (hereinafter, referred to as an EV mode) and a hybrid vehicle running mode (hereinafter, referred to as a hybrid mode or an HEV mode). The configuration and operation, etc. of the hybrid system 1 will be explained in detail below.

As shown in FIG. 1, a vehicle built with the hybrid system 1 includes the engine 2, the power generator motor 3, the battery (e.g., a high-voltage battery) 4, the drive motor 5, and a hybrid controller 6. Moreover, as shown in FIG. 2, the vehicle built with the hybrid system 1 further includes an SOC (State Of Charge) sensor 11, an accelerator pedal opening degree sensor 12, a brake pedal depression degree sensor 13, a shift position sensor 14, an engine controller 15, a power generator motor inverter 16, and a drive motor inverter 17.

As shown in FIG. 1, in the hybrid system 1, units like the hybrid controller 6 exchange signals or data through a communication line 18 that configures a CAN (Controller Area Network), etc.

The SOC sensor 11 detects the SOC of the battery 4. Next, the SOC sensor 11 outputs a detected value to the hybrid controller 6. Moreover, the accelerator pedal opening degree sensor 12 detects an accelerator pedal opening degree, i.e., the operated level of an accelerator pedal. Next, the accelerator pedal opening degree sensor 12 outputs a detected value to the hybrid controller 6. The brake pedal depression degree sensor 13 detects a brake pedal depression degree. i.e., the operated level of a brake pedal. Next, the brake pedal depression degree sensor 13 outputs a detected value to the hybrid controller 6. Furthermore, the shift position sensor 14 detects a shift position. Next, the shift position sensor 14 outputs a detected value to the hybrid controller 6.

The hybrid controller 6 executes various controls for driving the engine 2, the power generator motor 3, and the drive motor 5, respectively, based on a sensor detected values from the SOC sensor 11, etc., and the motor speeds of the power generator motor 3 and the drive motor 5. In order to do so, the hybrid controller 6 outputs an engine drive request to the engine controller 15 to control the running of the engine 2. Moreover, the hybrid controller 6 outputs a power generator motor torque request to the power generator motor inverter 16 to control the drive of the power generator motor 3. The hybrid controller 6 outputs a drive motor torque request to the drive motor inverter 17 to control the drive of the drive motor 5. Furthermore, the hybrid controller 6 calculates a vehicle speed based on the motor speed of the drive motor 5 obtained from the drive motor inverter 17 (or directly from the drive motor 5).

The engine controller 15 controls the speed and the torque of the engine 2 to realize the engine drive request from the hybrid controller 6. The engine controller 15 controls, for example, the throttle open degree of a throttle valve of the engine 2, or an injected fuel amount, etc. to control the speed and the torque of the engine 2.

The power generator motor inverter 16 controls the drive of the power generator motor 3. More specifically, the power generator motor inverter 16 controls each phase of the power generator motor 3 by a drive current for each phase, and controls (hereinafter, referred to as a power generating control) the power generator motor 3 to generate power. At this time, the power venerator motor inverter 16 outputs the motor speed of the power generator motor 3 to the hybrid controller 6.

The power generator motor 3 has a rotating shaft coupled with the output shaft of the engine 2. Therefore, the power generator motor 3 generates power by the driving force of the engine 2. The power generator motor 3 supplies the power to the battery 4 or the drive motor 5. The battery 4 is connected to the power generator motor 3 and the drive motor 5, and is charged by the power generated by the power generator motor 3 or the power (regenerative power) generated by the drive motor 5.

The drive motor inverter 17 controls the drive of the drive motor 5. More specifically, the drive motor inverter 17 controls each phase of the drive motor 5 by a drive current for each phase, and thereby performs a power running control or a regenerative control on the drive motor 5. At this time, the drive motor inverter 17 outputs the motor speed of the drive motor 5 to the hybrid controller 6.

The drive motor 5 is coupled with a drive shaft linked with the driving wheels 31 and 32. The drive motor 5 is driven by the power generated by the power generator motor 3 or the power (discharged power) output by the battery 4. Accordingly, the drive motor 5 drives the drive shaft, thereby driving the driving wheels 31 and 32.

Next, an explanation will be given of an example process executed by the hybrid system 1 based on the vehicle running condition and the SOC.

Figure 3:
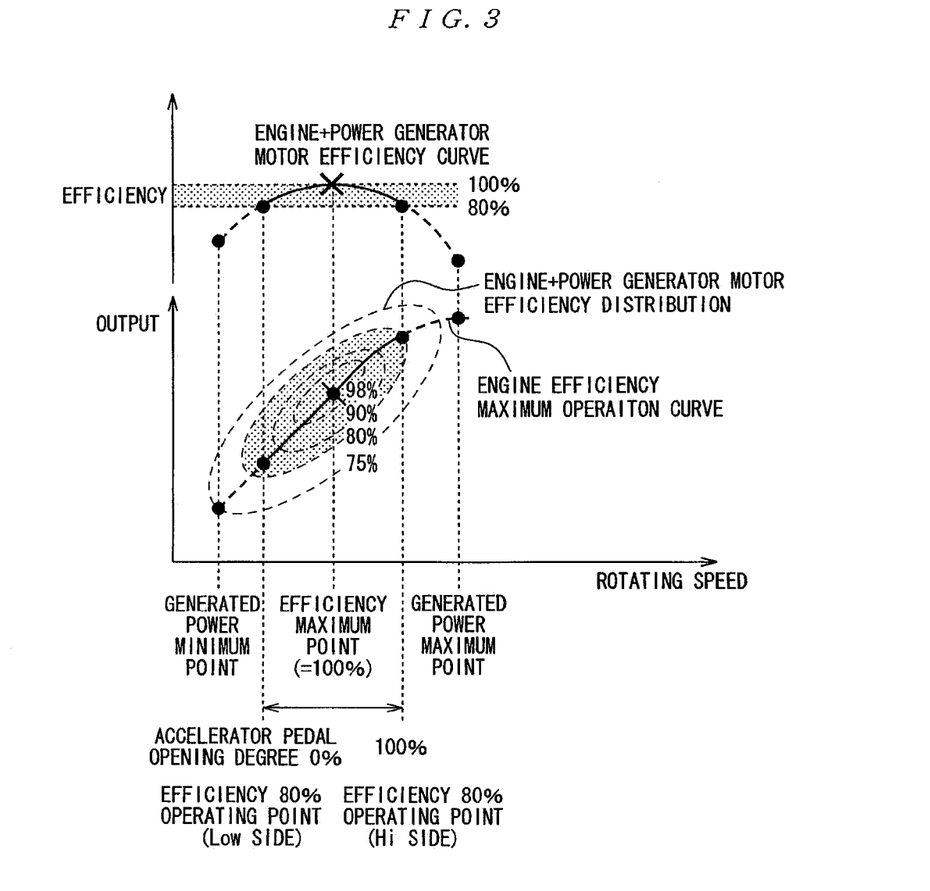
FIG. 3 is a diagram showing an example table used for an engine operation point, control process based on a vehicle running condition and an SOC (State Of Charge) executed by the hybrid system.

FIG. 3 is a diagram showing a table that is used when the operating point of the engine 2 is controlled through this process.

The engine controller 15 controls, using the table shown in FIG. 3, the speed and the output (i.e., the output torque) of the engine 2 so that the engine 2 operates at an engine operating point (an engine operating point determined by a target engine speed and a target engine torque) set in advance.

An explanation will now be given of the procedures of obtaining the table shown in FIG. 3.

The procedures of obtaining the table will be explained with reference to FIGS. 4 to 7.

Figure 4:
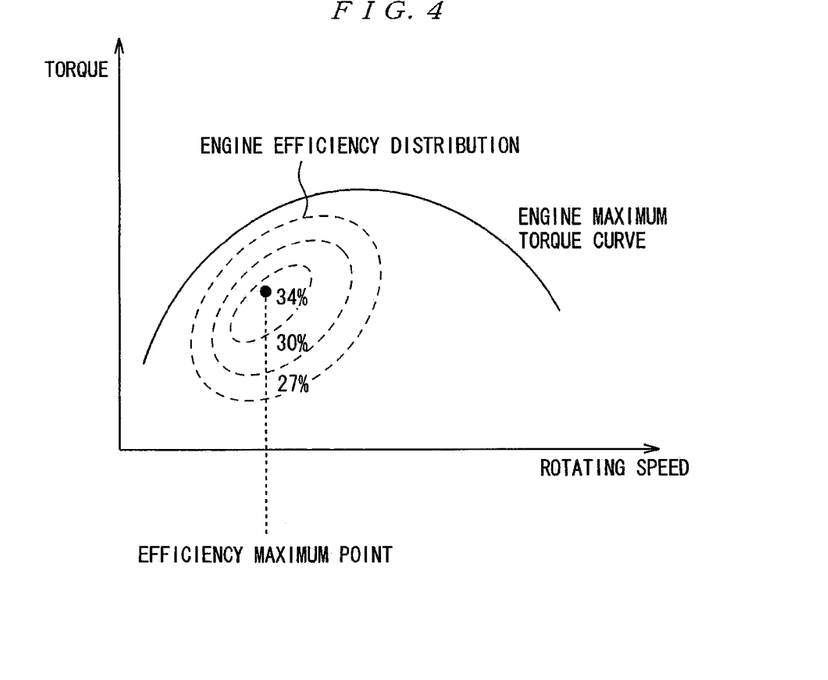
FIG. 4 is a characteristic diagram showing an example relationship between typical engine torque and engine speed, and engine efficiency.

First of all, FIG. 4 is a characteristic diagram showing an example relationship between typical engine torque and engine speed, and engine efficiency. As shown in FIG. 4, for engine operating points based on an engine torque and an engine speed, by interconnecting the points where the engine efficiency becomes equal, an engine efficiency distribution can be obtained. According to this engine efficiency distribution, its center point is the point indicating the maximum value of the engine efficiency (hereinafter, referred to as an engine efficiency maximum point), and an outermost curve is an engine maximum torque curve.

Figure 5:
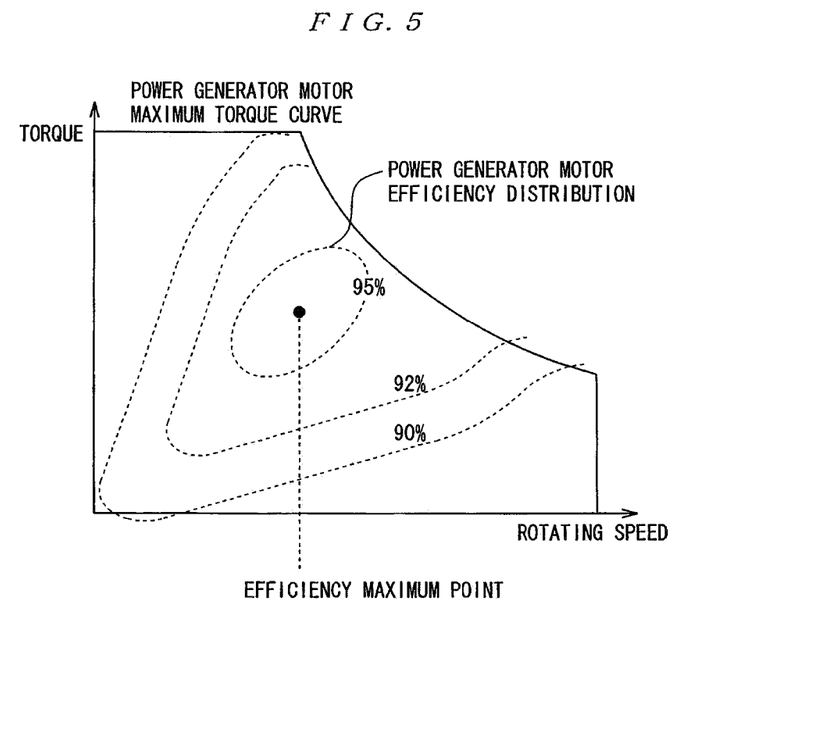
FIG. 5 is a characteristic diagram showing an example relationship between typical motor (a power generator motor) torque and motor speed, and motor efficiency.

FIG. 5 is a characteristic diagram showing an example relationship between typical motor (in this embodiment, the power generator motor 3) torque and motor speed (in this embodiment, consistent with the engine speed), and motor efficiency. As shown in FIG. 5, for operating points based on a motor torque and a motor speed, by interconnecting points where the motor efficiency becomes equal, a motor efficiency distribution can be obtained. According to this motor efficiency distribution, its center point is the point indicating the maximum value of the motor efficiency (hereinafter, referred to as a motor efficiency maximum point) and an outermost curve is a motor maximum torque curve.

Figure 6:
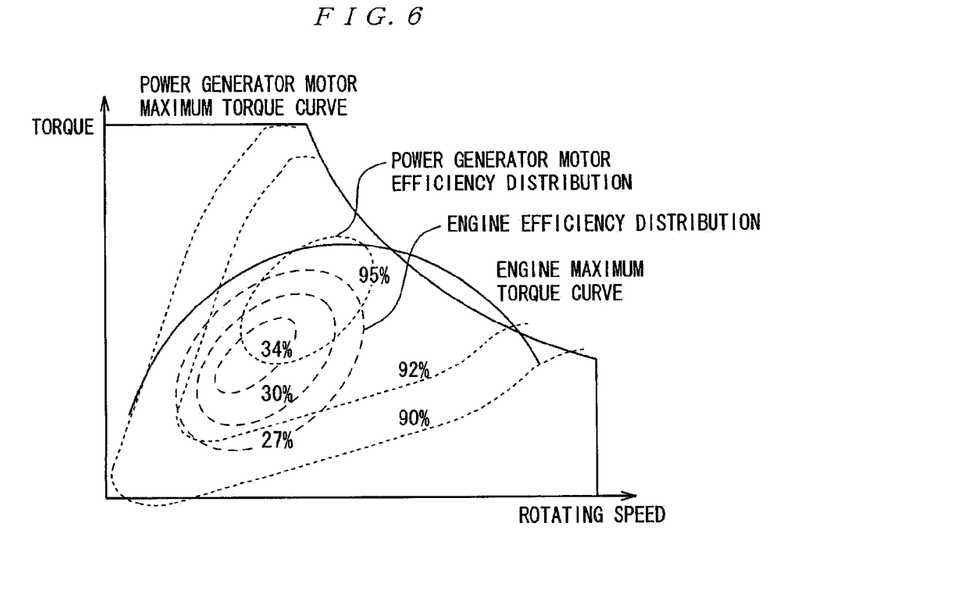
FIG. 6 is a diagram showing an example of superimposing the characteristic diagram of FIG. 4 showing the relationship between the engine torque and the engine speed, and the engine efficiency with the characteristic diagram of FIG. 5 showing the relationship between the motor torque and the motor speed, and the motor efficiency.
Figure 7:
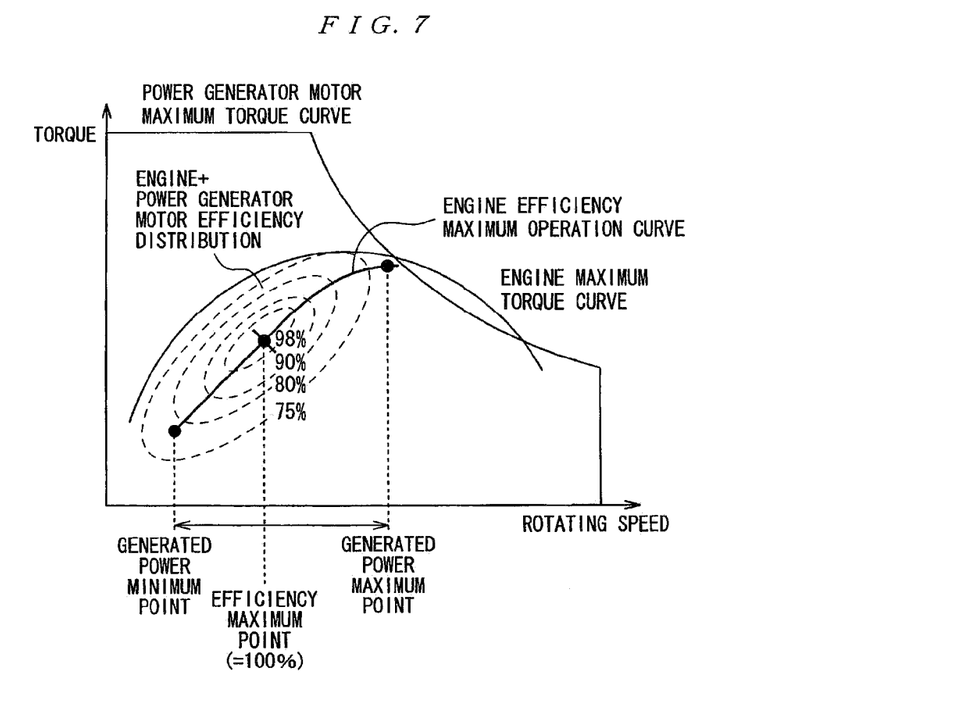
FIG. 7 is a characteristic diagram showing an example of engine-motor efficiency distribution obtained by interconnecting the points where the power generation efficiency determined by the engine efficiency and the motor efficiency becomes equal in the characteristic diagram of FIG. 6.

FIG. 6 shows an example characteristic diagram (a characteristic diagram for a power generation efficiency) having the characteristic diagram of FIG. 4 showing the relationship between the engine torque and the engine speed and the engine efficiency superimposed on the characteristic diagram of FIG. 5 showing the relationship between the motor torque and the motor speed, and the motor efficiency. FIG. 7 is an example characteristic diagram showing an engine-motor efficiency distribution (i.e., an engine motor efficiency distribution) obtained by interconnecting the points where a power generation efficiency (i.e., a power generation efficiency of the system) determined by the engine efficiency and the motor efficiency is equal in the characteristic diagram of FIG. 6. As shown in FIG. 7, the maximum point of the efficiency (hereinafter, referred to as art efficiency maximum point) can be obtained at the center point of the engine-motor efficiency distribution, and an engine efficiency maximum operation curve (or an engine efficiency, etc., effective line) can be obtained which is a curve passing within the engine-motor efficiency distribution and also passing through the efficiency maximum point. According to this embodiment, when tracing this engine efficiency maximum operation curve, the faster the engine speed is, the larger the engine torque becomes.

The engine efficiency maximum operation curve can be obtained as explained above. Hence, FIG. 3 shows the table for controlling the engine speed and the engine torque to cause the engine to operate at the engine operating points (i.e., the values determined by the target engine speed and the target engine torque) on the engine efficiency maximum operation curve. Moreover, the table shown in FIG. 3 is an example in which the range where the engine operating point moves is within the range where the engine-motor efficiency is equal to or greater than 80% (i.e., within a first range). Accordingly, when the table shown in FIG. 3 is used, the engine operating point moves on the engine efficiency maximum operation curve, is located at 80% of the engine-motor efficiency at a Low side when the operated level of the accelerator pedal is 0% (i.e., the accelerator pedal is completely undepressed), and is located at 80% of the engine-motor efficiency at a High side when the operated level of the accelerator pedal is 100% (i.e., the accelerator pedal is fully depressed).

Figure 8:
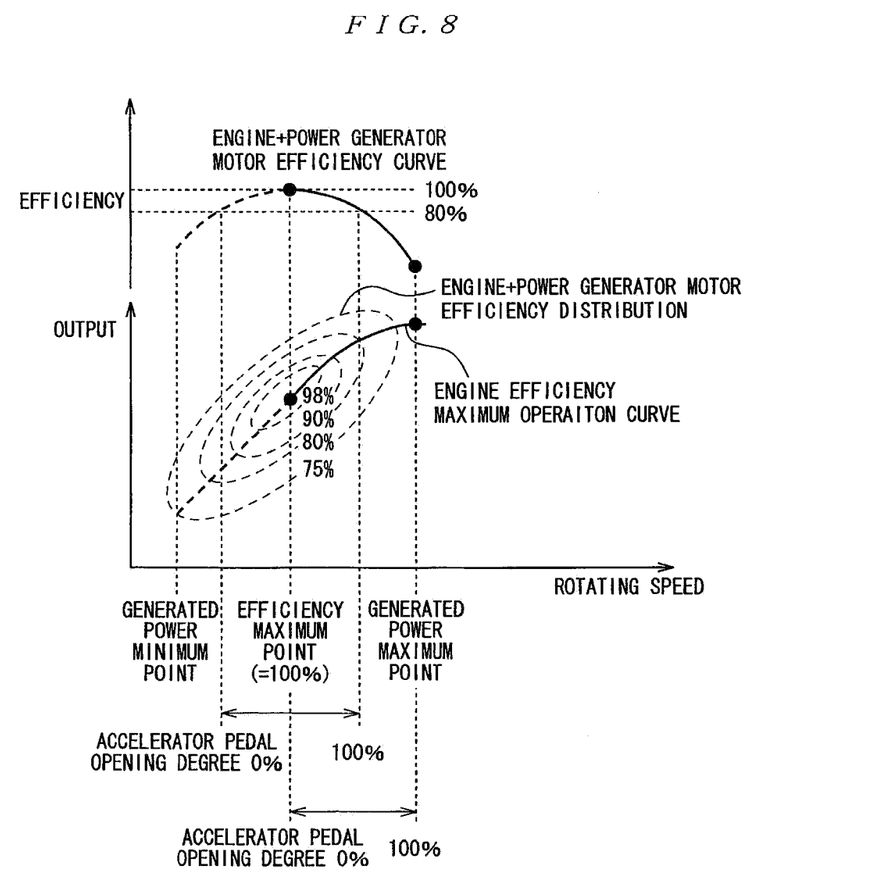
FIG. 8 is a diagram showing an example table for setting the movable maize of an engine operating point when the SOC decreases.

According to this embodiment, the movable range of the engine operating point is changed when the SOC decreases, the vehicle is stopping, and the vehicle is running at a slow speed. FIG. 8 shows an example table for setting the movable range of the engine operating point when the SOC decreases. Moreover, FIG. 9 shows an example table for setting the operation range of the engine operating point when the vehicle is stopping or running at a slow speed.

Figure 9:
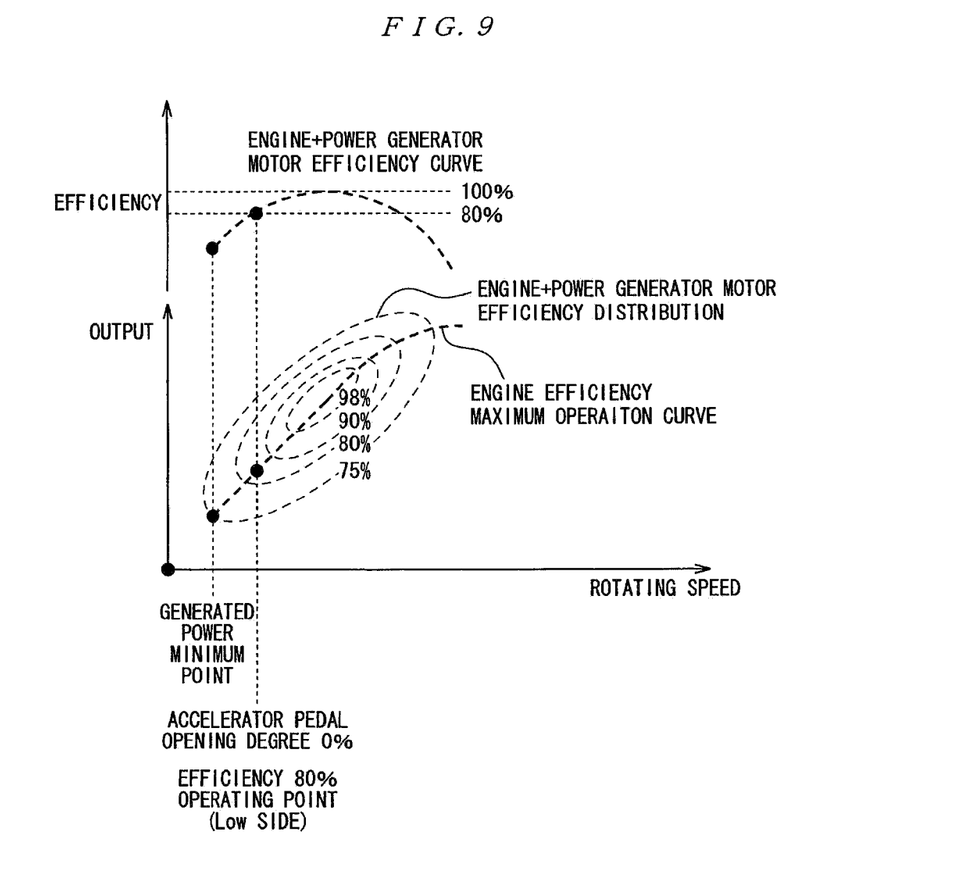
FIG. 9 is a diagram showing an example table for setting the movable range of an engine operating point when a vehicle is stopping and is running at a slow speed.
Figure 10:
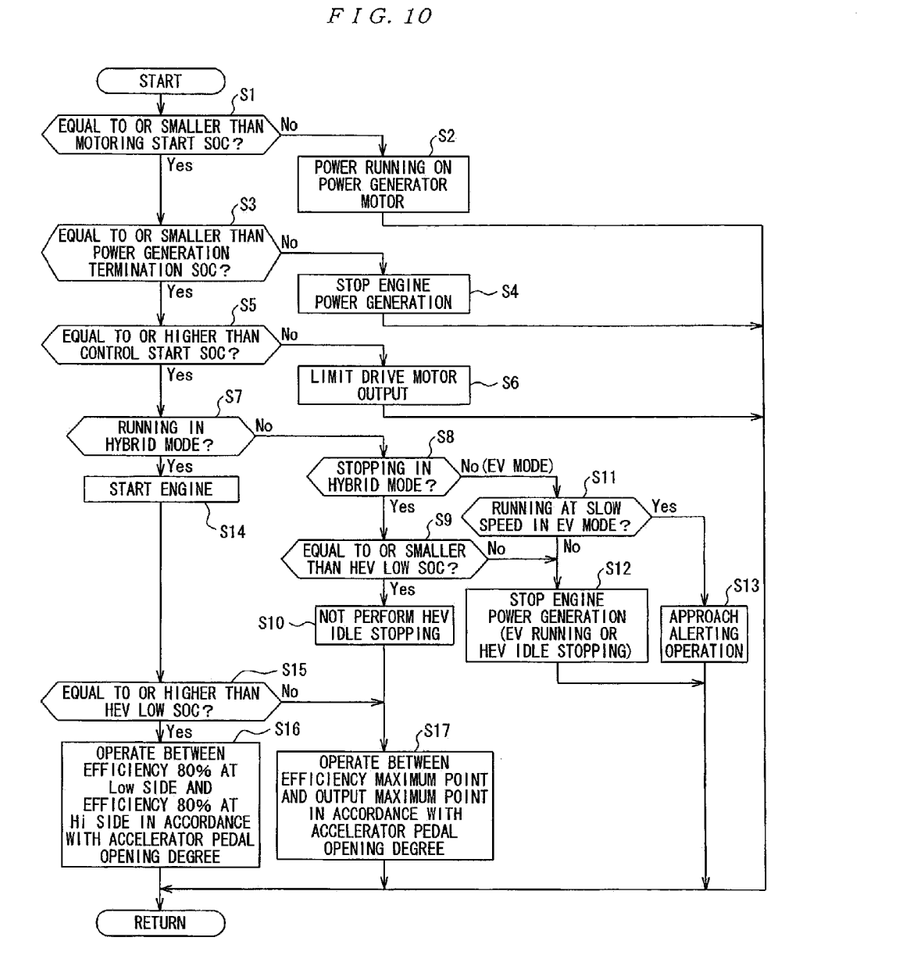
FIG. 10 is a flowchart showing an example process executed by a hybrid controller and an engine controller using data shown in FIGS. 3, 8, and 9.

FIG. 10 is a flowchart showing an example process executed by the hybrid controller 6 and the engine controller 15 using the tables shown in FIGS. 3, 8, and 9.

As shown in FIG. 10, the hybrid controller 6 determines in step S1 whether or not the SOC detected by the SOC sensor (hereinafter, referred to as a detected SOC) is equal to or lower than a motoring start SOC set in advance. The motoring start SOC is an SOC value for determining whether or not to consume the power of the battery 4 by the power running of the power generator motor 3 without injecting the fuel to the engine 2. The motoring start SOC is a value higher than, for example, 90%. When the hybrid controller 6 determines that the detected SOC is equal to or lower than the motoring start SOC (i.e., detected SOC≤motoring start SOC), the process progresses to step S3. Conversely, when the hybrid controller 6 determines that the detected SOC is larger than the motoring start SOC (i.e., detected SOC>motoring start SOC), the process progresses to step S2.

The hybrid controller 6 causes the power generator motor inverter 16 to perform power running on the power generator motor 3 in the step S2. At this time, the hybrid controller 6 causes the engine controller 15 to terminate injecting the fuel to the engine 2. Hence, the engine 2 rotates without a fuel injection. Thereafter, the hybrid controller 6 terminates the process shown in FIG. 10.

The hybrid controller 6 determines in the step S3 whether or not the detected SOC is equal to or lower than a power generation termination SOC set in advance. The power generation termination SOC is an SOC value for determining whether or not to terminate the power generation by the power generator motor 3. The power generation termination SOC is a smaller value than the motoring start SOC, and is, for example, 90%. When the hybrid controller 6 determines that the detected SOC is equal to or lower than the power generation termination SOC (i.e. detected SOC≤power generation termination SOC), the process progresses to step S5. Conversely, when the hybrid controller 6 determines that the detected SOC is larger than the power generation termination SOC (i.e., detected SOC>power generation termination SOC), the process progresses to step S4.

The hybrid controller 6 terminates the power generation through the running of the engine 2, i.e., terminates the power generation by the power generator motor 3 in the step S4. Next, the hybrid controller 6 terminates the process shown in FIG. 10.

The hybrid controller 6 determines in the step S5 whether or not the detected SOC is equal to or higher than a control start SOC set in advance. The control start SOC is an SOC value for determining whether or not to drive the drive motor 5 at 100% of an output. The control start SOC is, for example, 20%. When the hybrid controller 6 determines that the detected SOC is equal to or higher than the control start SOC (i.e., detected SOC≥control start SOC), the process progresses to step S7. Conversely, when the hybrid controller 6 determines that the detected SOC is lower than the control start SOC detected SOC<control start SOC), the process progresses to step S6.

The hybrid controller 6 causes the drive motor inverter 17 to limit the output by the drive motor 5 (i.e., power running control) in the step S6. For example, the hybrid controller 6 decreases the output by the drive motor 5 to 0%. In general, the hybrid controller 6 performs power running control or regenerative control on the drive motor 5 at 100% of the output so as to accomplish running conditions (e.g., a vehicle speed and torque, etc. accordance with an accelerator pedal operation, a brake pedal operation, or a shift position in the hybrid mode or in the EV mode. In the step S6, however, the output is restricted. Next, the hybrid controller 6 terminates the process shown in FIG. 10.

The hybrid controller 6 determines in the step S7 whether or not the vehicle is running in the hybrid mode. When for example, the detected SOC is lower them an HEV target SOC set in advance, the hybrid controller 6 determines that the vehicle is running in the hybrid mode. The HEV target SOC is, for example, an SOC value for determining whether or not to change the mode between the hybrid mode and the EV mode. Moreover, the hybrid controller 6 calculates the vehicle speed based on the motor speed of the drive motor 5, and determines whether or not the vehicle is running based on the calculated vehicle speed. When the hybrid controller 6 determines that the vehicle is running in the hybrid mode, the process progresses to step S14. Conversely, when the hybrid controller 6 determines that the vehicle is running in a non-hybrid mode, or the vehicle is stopping in the hybrid mode, etc., the process progresses to step S8.

The hybrid controller 6 determines in the step S8 whether or not the vehicle is stopping in the hybrid mode. When, for example, the vehicle speed calculated based on the motor speed of the drive motor 5 is zero, the hybrid controller 6 determines that the vehicle is stopping. When the hybrid controller 6 determines that the vehicle is stopping in the hybrid mode, the process progresses to step S9. Conversely, when the hybrid controller 6 determines that the vehicle is not stopping in the hybrid mode, i.e., when the vehicle is stopping or running in the EV mode, the process progresses to step S11. An operation "idle stopping" (i.e., a no idling) is to stop the running of the engine 2 when the vehicle is stopping (e.g., when the vehicle is stopping so as to satisfy a preset idle stopping condition) in the hybrid mode in order to improve the effects of saving the fuel and reducing the exhaust gas, etc.

The hybrid controller 6 determines in the step S9 whether or not the detected SOC is equal to or lower than an HEY low SOC (or an idle stopping execution determination SOC). The HEV low SOC (or the idle stopping execution determination SOC) is an SOC value for avoiding the idle stopping when the SOC of the battery 4 is too low. The HEY low SOC is, for example, 25%. When the hybrid controller 6 determines that the detected SOC is equal to or lower than the HEV low SOC (i.e., detected SOC≤HEV low SOC), the process progresses to step S10. Conversely, when the hybrid controller 6 determines that the detected SOC is higher than the HEV low SOC (i.e., detected SOC>HEV low SOC), the process progresses to step S12.

The hybrid controller 6 does not execute the idle stopping in the step S10. Hence, when the idle stopping is already executed, the hybrid controller 6 cancels the idle stopping. Next, the process progresses to step S17.

Since the operated level of the accelerator pedal is 0% when the vehicle is stopping, the hybrid controller 6 controls the operation of the engine 2 when the engine-motor efficiency is 100% (i.e., the efficiency maximum point) in the step S17.

The hybrid controller 6 determines in the step S11 whether or not the vehicle is running at a slow speed in the EV mode. When the hybrid controller 6 determines that the vehicle is running at a slow speed in the EV mode, the process progresses to step S13. Conversely, when the hybrid controller 6 determines that the vehicle is in the EV mode but is not running at a slow speed, i.e., when the vehicle is in the EV mode and is stopping or running normally, the process progresses to step S12. When, for example, the running speed is equal to or lower than a preset threshold value (e.g., 20 km/h) for determining whether or not the vehicle is running at a slow speed, the hybrid controller 6 determines that the vehicle is running at a slow speed.

The hybrid controller 6 terminates the power generation through the running of the engine (i.e., stops the running of the engine) in the step S12. More specifically, when the determination result in the step S11 is "NO", the hybrid controller 6 stops the running of the engine 2 (i.e., the engine speed=0 rpm) for the EV mode. Alternatively, when the determination result in the step S9 is "NO", the hybrid controller 6 stops the running of the engine 2 to perform idle stopping (i.e., the engine speed=0 rpm), in the hybrid mode. Next, the hybrid controller 6 terminates the process shown in FIG. 10.

The hybrid controller 6 causes the engine 2 to perform an operation for alerting of an approach (hereinafter, referred to as an approach alerting operation) in the step S13. More specifically, as the approach alerting operation, the hybrid controller 6 causes the engine 2 to be a condition in which the generated power becomes a minimum point (hereinafter, referred to as a generated power minimum point) or to be an unloaded idling condition through the engine controller 15. The hybrid controller 6 causes the engine 2 to perform the approach alerting operation based on the table shown in FIG. 9 when the vehicle is running at a slow speed. Mote specifically, as the approach alerting operation, the hybrid controller 6 controls the speed and the torque of the engine 2 so that the engine operating point is located at the generated power minimum point a point at a Low side where the engine-motor efficiency is lower than 80%) on the engine efficiency maximum operation curve. At this time, the engine controller 15 sets the engine speed to be, for example, 1000 rpm. Thereafter, the hybrid controller 6 terminates the process shown in FIG. 10.

In the step S13, the hybrid controller 6 may cause the engine 2 to be an unloaded idling condition. For example, the engine controller 15 injects the fuel at the minimum amount to the engine 2 to stop the power generation by the power generator motor 3, thereby making the engine 2 in the unloaded idling condition. At this time, the engine controller 15 sets the engine speed to be, for example, 1000 rpm. Thereafter, the hybrid controller 6 terminates the process shown in FIG. 10.

The hybrid, controller 6 causes the engine controller 15 to start the engine 2 in the step S14. At this time, the hybrid controller 6 also starts the power generation by the power generator motor 3 as needed.

Next, the hybrid controller 6 determines in step S15 whether or not the detected SOC is equal to or higher than the HEV low SOC. The HEV low SOC is an SOC value that must be maintained as a minimum value in the hybrid mode. The HEV low SOC is, for example, 25%. When the hybrid controller 6 determines that the detected SOC is equal to or higher than the HEV low SOC (i.e., detected SOC≥REV low SOC), the process progresses to step S16. Conversely, when the hybrid controller 6 determines that the detected SOC is lower than the HEV low SOC (i.e., detected SOC<HEV low SOC), the process progresses to step S17.

The hybrid controller 6 controls the operation of the engine 2 based on the table shown in FIG. 3 in the step S16. That is, the hybrid controller 6 controls the speed and the torque of the engine 2 in accordance with the operated level of the accelerator pedal in such a way that the engine operating point moves along the engine efficiency maximum operation curve within a range where the engine-motor efficiency at the Low side is 80% when the operated level of the accelerator pedal is 0% (i.e., the accelerator pedal is completely undepressed) and the engine-motor efficiency at the Hi side is 80% when the operated level of the accelerator pedal is 100% (i.e., the accelerator pedal is fully depressed). At this time, the engine speed is controlled between, for example, 2000 rpm to 4000 rpm in accordance with the operated level of the accelerator pedal operated between 0% to 100%. Thereafter, the hybrid controller 6 terminates the process shown in FIG. 10.

The hybrid controller 6 controls the operation of the engine 2 based on the table when the SOC decreases as shown in FIG. 8 in the step S17. That is, the hybrid controller 6 controls the speed and the torque of the engine 2 in accordance with the operated level of the accelerator pedal so that the engine operating point moves along the engine efficiency maximum operation curve within a range (i.e., a second range) where the engine-motor efficiency is 100% (i.e., the efficiency maximum point) when the operated level of the accelerator pedal is 0% (i.e., the accelerator pedal is completely undepressed) and the engine-motor efficiency is generated at a power maximum point when the operated level of the accelerator pedal is 100% (i.e., the accelerator pedal is fully depressed). At this time the engine speed is controlled between, for example, 3000 rpm to 5000 rpm in accordance with the operated level of the accelerator pedal that is operated between 0% and 100%. Next, the hybrid controller 6 terminates the process shown in FIG. 10.

The control for the speed and the torque of the engine 2 in the steps S16 and S17 is realized by a throttle control performed b) the engine controller 15 and a power generator motor torque control performed by the power generator motor inverter 16. Hence, the engine controller 15 makes the engine output and the power generator motor torque balanced to control the speed and the torque of the engine 2 so as to realize the engine operating point explained as the process contents of the steps S16 and S17 based on the instruction from the hybrid controller 6.

(Operations)

Figures 11A, 11B:
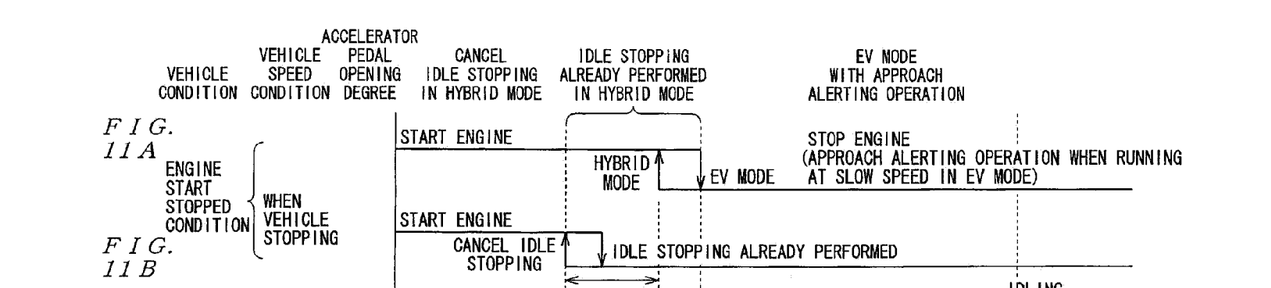
FIG. 11 is a diagram for explaining an operation and an action, etc., in the hybrid system.
Figures 11C, 11D:
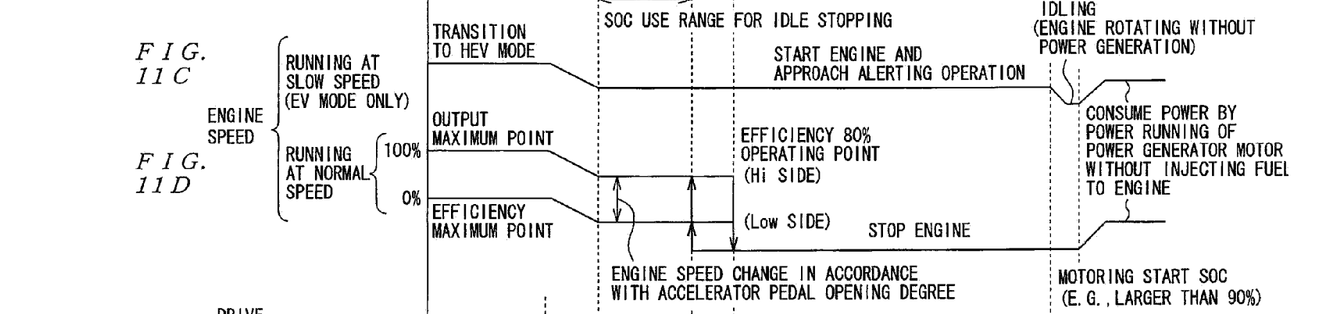
Figure 11E:
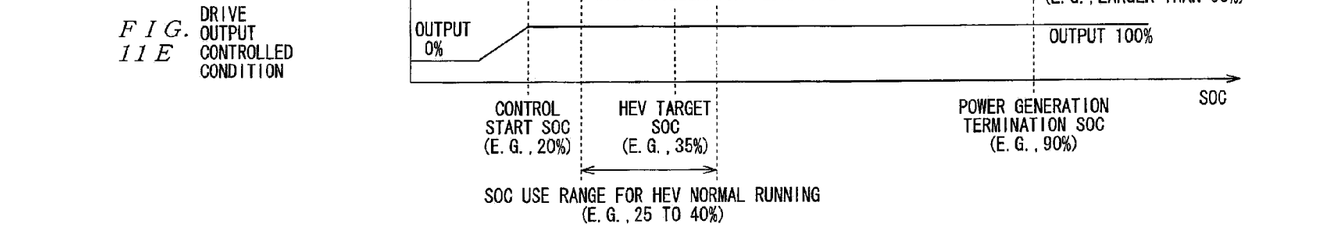

Next, an explanation will be given of an operation, a working, etc., of the hybrid system 1 with reference to FIGS. 11A to E.

(Explanation with Reference to FIG. 11A)

As shown in FIG. 11A, the hybrid system 1 changes the mode between the hybrid mode and the EV mode based on the detected SOC. More specifically, when the detected SOC is equal to or lower than the HEY target SOC, the hybrid system 1 sets the mode to be the hybrid mode, and when the detected SOC is larger than the HEY target SOC, the hybrid system 1 changes the mode to the EV mode. Moreover, when the vehicle is running at a slow speed even in the EV mode, the hybrid system 1 drives the engine 2 at a slow rotating speed (e.g., 1000 rpm) as the approach alerting operation (the above-explained step S13).

The HEV target SOC is for example, 35%. Moreover, as shown in FIG. 11A, a mode change determination value for changing the mode between the hybrid mode and the EV mode may be set with a hysteresis.

When the vehicle is running at a slow speed, the hybrid system 1 can alert a pedestrian to the approaching of the vehicle thereto by the engine sound at the slow rotating speed through the approach alerting operation in the EV mode. Hence, the hybrid system 1 can accomplish both alerting a pedestrian, to the approaching of the vehicle thereto and prevention of causing the pedestrian to feel discomfort by the engine noise (e.g., the engine sound at the fast rotating speed) in the EV mode without an addition of electric or mechanical approach alerting devices.

(Explanation with Reference to FIG. 11B)

Moreover, as shown in FIG. 11B, when the vehicle is stopping in the hybrid mode, the hybrid system 1 performs the idle stopping when the detected SOC is larger than the HEV low SOC (the above-explained step S12), and when the detected SOC is equal to or lower than the HEV low SOC, the hybrid system 1 starts the engine 2 so as not to perform the idle stopping or so as to cancel the idle stopping currently performed (the above-explained step S10).

Furthermore, as shown in FIG. 11B, a change determination value for changing execution/unexecution of the idle stopping may be set with a hysteresis.

Hence, the hybrid system 1 can set the SOC value to be small for changing a state in which the idle stopping is executed to a state in which the execution of the idle stopping is canceled, and can make the SOC use range for the idle stopping (i.e., the range of the SOC that permits the power consumption of the battery 4 at the tune of the idle stopping) wide, thereby extending the time for maintaining the idle stopping while the vehicle is stopping.

(Explanation with Reference to FIG. 11C)

As shown in FIG. 11C, when the vehicle is running at a slow speed in the hybrid mode, if the detected SOC becomes larger than the power generation termination SOC, the hybrid system 1 terminates the power generation through the running of the engine 2 (the above-explained step S4). Thereafter, when the detected SOC becomes larger than the motoring start SOC, the hybrid system 1 performs a power running control on the power generator motor 3 (the above-explained step S2). The hybrid system 1 can suppress an increase of the SOC due to regeneration through the power running.

(Explanation with Reference to FIG. 11D)

As shown in FIG. 11D, when the vehicle is normally running (when the vehicle is running at a normal speed (e.g., faster speed than 20 km/h)) in the hybrid mode, if the detected SOC is equal to or higher than the HEV low SOC, the hybrid system 1 controls the speed and the torque of the engine 2 in accordance with the operated level of the accelerator pedal in such a way that the engine operating point moves within a range on the engine efficiency maximum operation curve where the engine-motor efficiency at the Low side is 80% when the operated level of the accelerator pedal is 0% and the engine-motor efficiency at the Hi side is 80% when the operated level of the accelerator pedal is 100% (the above-explained step S16). Conversely, if the detected SOC is smaller than the HEV low SOC, the hybrid system 1 controls the speed and the torque of the engine 2 in accordance with the operated level of the accelerator pedal in such a way that the engine operating point moves within a range on the engine efficiency maximum operation curve where the engine-motor efficiency is 100% (i.e., the efficiency maximum point) when the operated level of the accelerator pedal is 0% and the engine-motor efficiency is the generated power maximum point when the operated level of the accelerator pedal is 100% (the above-explained step S17). That is the hybrid system 1 shifts the movable range of the engine operating point to the fast rotating speed and high output sides on the engine efficiency maximum operation curve when the detected SOC decreases.

As explained above, the hybrid system 1 limits the movable range of the engine operating point (i.e., the range where the engine speed changes) to a range where the engine power generation efficiency is high (e.g., a range equal to or higher than 80%) while having some margins to some extent, thereby providing an acceleration feeling to a driver and a passenger through an engine sound, at the same rime, improving the power generation efficiency.

Moreover, when the detected SOC decreases, the hybrid system 1 shifts the movable range of the engine operating point over the engine efficiency maximum operation curve to the fast rotating speed and high output sides, thereby providing an acceleration feeling to the driver and the passenger by the engine sound and recovering the SOC by giving priority to a battery charging. Since the engine operating point when the operated level of the accelerator pedal is little is inevitably shifted to the fast rotating speed and high output sides, the power generation efficiency at a range where the operated level of the accelerator pedal is little improves, and thus charging of the battery 4 becomes more efficient.

The hybrid system 1 executes an arithmetic processing relating to the power generation efficiency using the tables shown in FIG. 3, etc., i.e., executes an arithmetic processing relating to the power generation efficiency using the data defining in advance the correlation between the engine speed, the engine torque and the power generation efficiency (i.e., the engine-motor efficiency) of the engine+the power generator motor, thereby improving the power generation efficiency without an increase of the program load like a feedback process, etc.

As shown in FIG. 11D, when the vehicle is running normally in the hybrid mode, if the detected SOC becomes equal to or higher than the change determination SOC set in advance, the hybrid system 1 may stop the engine 2. When the engine 2 is stopped based on a change determination SOC in this way, the change determination SOC may be set to have a hysteresis as shown in FIG. 11D.

When the engine 2 is stopped based on the change determination SOC, as shown in FIG. 11D, the range between the HEV low SOC and the change determination SOC (more specifically, a value of the SOC when the operation mode of the engine 2 is changed from the running condition to the stopped condition) becomes the SOC use range for causing the vehicle to normally run in the HEV mode (i.e., the range of the SOC where power consumption of the battery 4 is permitted when the vehicle is normally running in the HEV mode).

Moreover, as shown in FIG. 11D, when the vehicle is normally running in the hybrid mode, if the detected SOC becomes larger than the motoring start SOC, the hybrid system 1 allows the power generator motor 3 to perform power running (the above-explained step S2).

In the example shown in FIG. 11D, when the detected SOC becomes equal to or higher than the change determination SOC, the engine 2 is already stopped. Accordingly, when the vehicle is normally running in the hybrid mode, even if the detected SOC becomes higher than the power generation termination SOC, the hybrid system 1 does not particularly perform an operation of terminating the power generation through the engine driving.

(Explanation with Reference to FIG. 11E)

Moreover, as shown in FIG. 11E, when the detected SOC is less than the control start SOC, the hybrid system 1 restricts the output by the drive motor 5, and when the detected SOC is equal to or higher than the control start SOC, the hybrid system 1 drives the drive motor 5 at 100% of the output.

In the above explanation for this embodiment, the accelerator pedal opening degree sensor 12 configures, for example, an accelerator pedal operated level detector. Moreover, the SOC sensor 11 configures, for example, a charging level detector. Furthermore, the hybrid controller 6 and the engine controller 15 configure, for example, a controller. Still further, the vehicle speed calculation process by the hybrid controller 6 realizes, for example, a vehicle speed detector.

Modifications to Embodiments

The above-explained embodiment was explained with reference to various specific values, but the present invention is not limited to such specific values. Such values are set in accordance with various factors like the configuration of a vehicle.

REFERENCE SIGNS LIST 1 hybrid system
2 engine
3 power generator motor
4 battery
5 drive motor
6 hybrid controller
11 SOC sensor
12 accelerator pedal opening degree sensor
15 engine controller

The invention claimed is:

1. A drive control device for a series hybrid vehicle including an engine, a power generator motor driven by the engine, a battery charged by power generated by the power generator motor, and a drive motor that drives driving wheels by the power generated by the power generator motor or discharged power by the battery, the drive control device comprising:
an accelerator pedal operated level detector that detects an operated level of an accelerator pedal;
a charging level detector that detects a charging level of the battery; and
a controller which controls a speed and a torque of the engine to allow the engine to operate at an engine operating point corresponding to a target engine speed and a target engine torque based on the operated level of the accelerator pedal detected by the accelerator pedal operated level detector within a first range where a power generation efficiency obtained based on a drive efficiency of the engine and a motor drive efficiency of the power generator motor is equal to or higher than a preset power generation efficiency when the charging level detected by the charging level detector is equal to or higher than a preset charging level, and which controls the speed and the torque of the engine to allow the engine to operate at the engine operating point based on the operated level of the accelerator pedal detected by the accelerator pedal operated level detector within a second range where the power generated by the power generator motor is larger than the generated power in a case of the first range when the charging level detected by the charging level detector is smaller than the preset charging level.

2. The drive control device for the series hybrid vehicle according to claim 1, further comprising a vehicle speed detector that detects a vehicle speed,
wherein when the vehicle speed detected by the vehicle speed detector is equal to or slower than a preset vehicle speed, the controller controls the speed and the torque of the engine within a range where the power generated by the power generator motor is smaller than the generated power in a case of the first range to allow the engine to operate at the engine operating point.

3. The drive control device for the series hybrid vehicle according to claim 2, wherein when the charging level detected by the charging level detector is smaller than the preset charging level, the controller controls the speed and the torque of the engine so as to increase the power generated by the power generator motor more than the generated power in a case in which the charging level detected by the charging level detector is equal to or higher than the preset charging level to allow the engine to operate at the engine operating point.

4. The drive control device according to claim 2, wherein when the vehicle speed detected by the vehicle speed detector is zero, the controller controls the speed of the engine to be zero.

* * * * *